(12) United States Patent (10) Patent No.: US 12,655,777 B2

Lee et al. (45) Date of Patent: Jun. 16, 2026

(54) SHIP WASTE HEAT POWER GENERATION SYSTEM UTILIZING WASTE HEAT FROM SHIPS

(71) Applicant: Korea Institute of Ocean Science & Technology, Busan (KR)

(72) Inventors: Ho Saeng Lee, Sokcho-si (KR); Seung Taek Lim, Sokcho-si (KR); Se Gyu Kim, Uljin-gun (KR); Jong Beom Seo, Daejeon (KR)

(73) Assignee: Korea Institute Ocean Science & Technology, Busan (KR)

( * ) Notice: Subject to any disclaimer, the term of this patent is extended or adjusted under 35 U.S.C. 154(b) by 0 days.

(21) Appl. No.: 19/062,370

(22) Filed: Feb. 25, 2025

(65) Prior Publication Data

US 2025/0198314 A1 Jun. 19, 2025

Related U.S. Application Data

(63) Continuation of application No. PCT/KR2023/011570, filed on Aug. 7, 2023.

(30) Foreign Application Priority Data

Sep. 21, 2022 (KR) ........................ 10-2022-0119571

(51) Int. Cl.
| | |
|---|---|
| *F01K 27/02* | (2006.01) |
| *B63J 3/00* | (2006.01) |
| *B63J 3/04* | (2006.01) |
| *F01K 11/00* | (2006.01) |
| *H02K 7/18* | (2006.01) |

(52) U.S. Cl.
CPC ................. *F01K 27/02* (2013.01); *B63J 3/04* (2013.01); *F01K 11/00* (2013.01); *H02K 7/1823* (2013.01); *B63J 2003/008* (2013.01)

(58) Field of Classification Search
CPC ... F01K 27/02; F01K 11/00; B63J 3/04; B63J 2003/008; H02K 7/1823
See application file for complete search history.

(56) References Cited

U.S. PATENT DOCUMENTS

| | | | | |
|---|---|---|---|---|
| 2014/0345280 A1* | 11/2014 | Son | .......................... | F01K 23/10 |
| | | | | 60/670 |
| 2019/0032852 A1* | 1/2019 | Lee | ............................. | B63J 4/00 |

FOREIGN PATENT DOCUMENTS

| | | |
|---|---|---|
| JP | 2011-089451 A | 5/2011 |
| KR | 10-2012-0127015 A | 11/2012 |
| KR | 10-2014-0042323 A | 4/2014 |

(Continued)

*Primary Examiner* — Joseph Ortega
(74) *Attorney, Agent, or Firm* — Dinsmore & Shohl LLP

(57) ABSTRACT

The present invention relates to a ship waste heat power generation system utilizing waste heat from ships. Specifically, the present invention relates to a ship waste heat power generation system utilizing waste heat from ships, wherein recovers exhaust gas waste heat and engine cooling water waste heat from ships using various fuels such as diesel, LNG, and dual-fuel. The recovered waste heat is used as a heat source, while seawater serves as the heat sink, generating electricity through the Organic Rankine Cycle (ORC). By combining exhaust gas waste heat and engine cooling water waste heat, which have different waste heat temperatures, in parallel or series to reduce the evaporation heat capacity, the ORC output is enhanced.

2 Claims, 3 Drawing Sheets

(56) References Cited

FOREIGN PATENT DOCUMENTS

| KR | 10-2020-0045865 | A | 5/2020 |
| KR | 10-2530053 | B1 | 5/2023 |

* cited by examiner

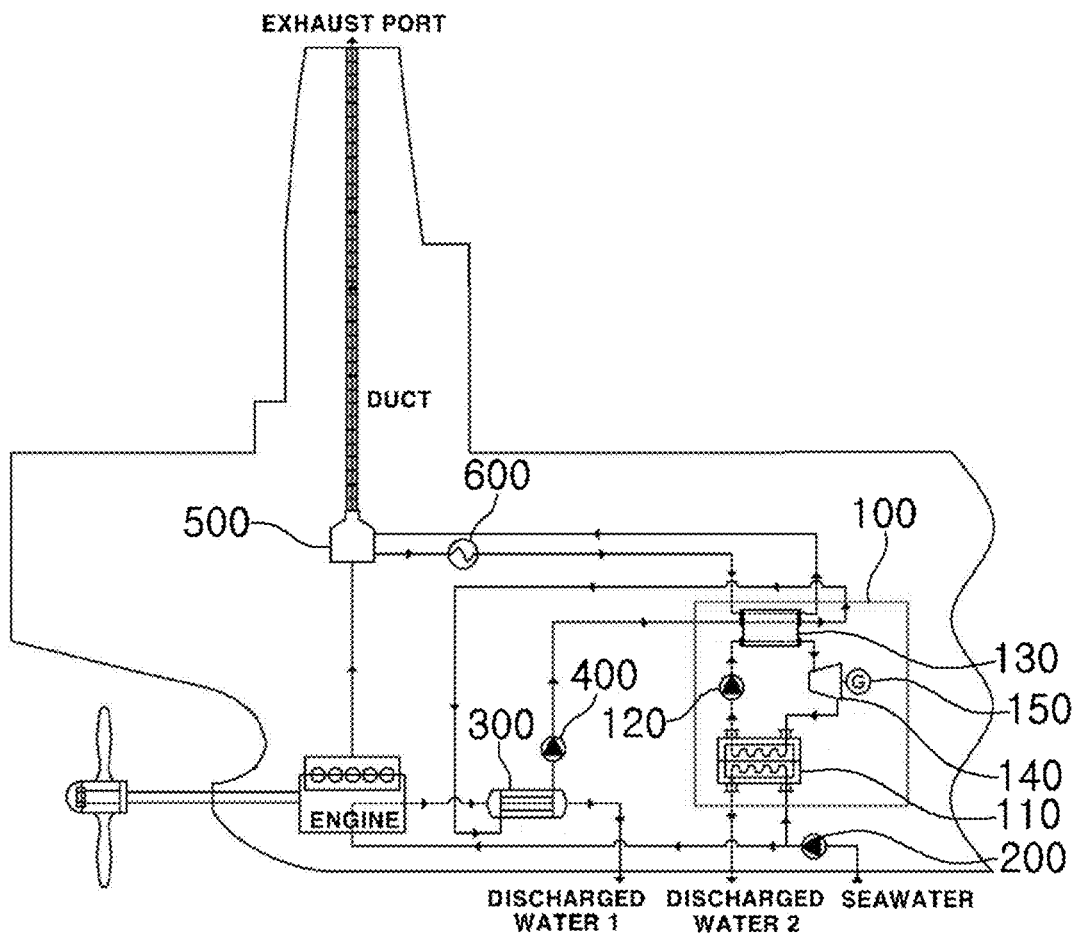
[FIG. 1]

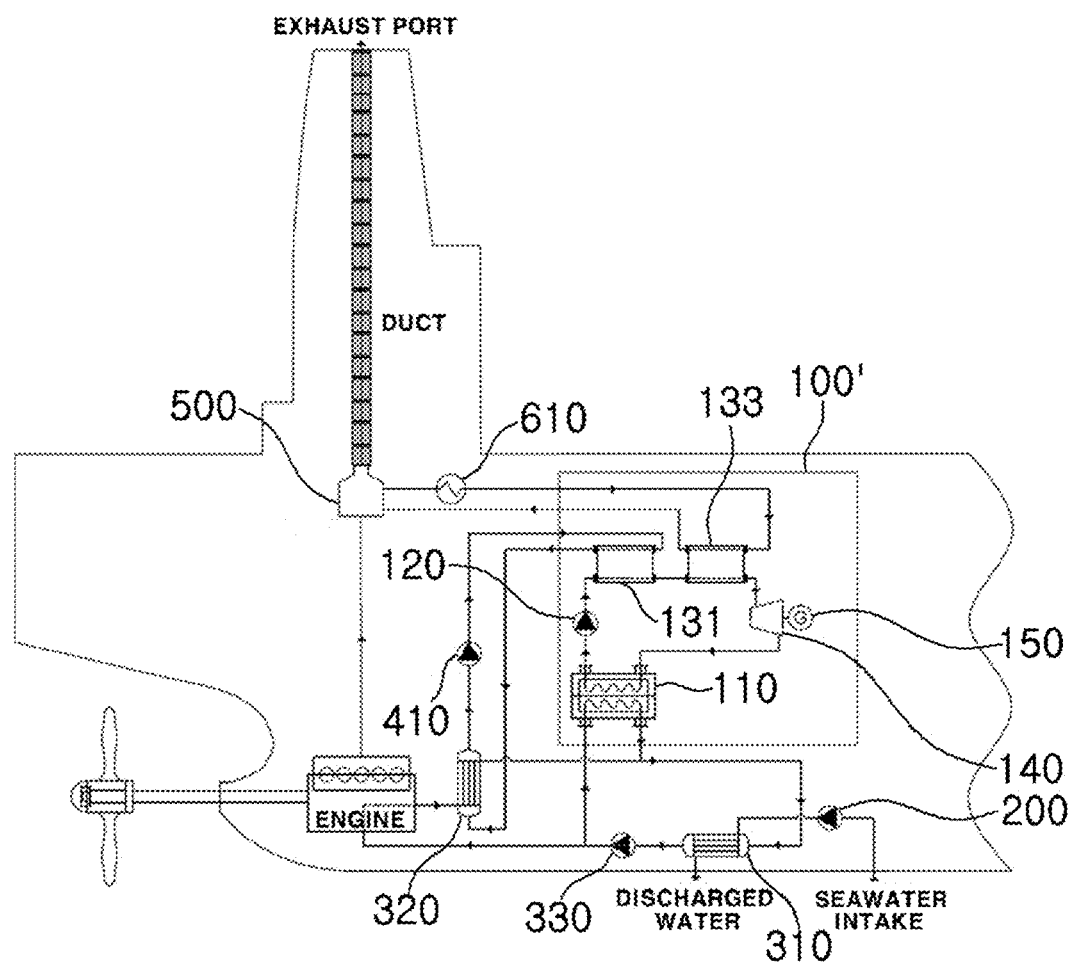
[FIG. 2]

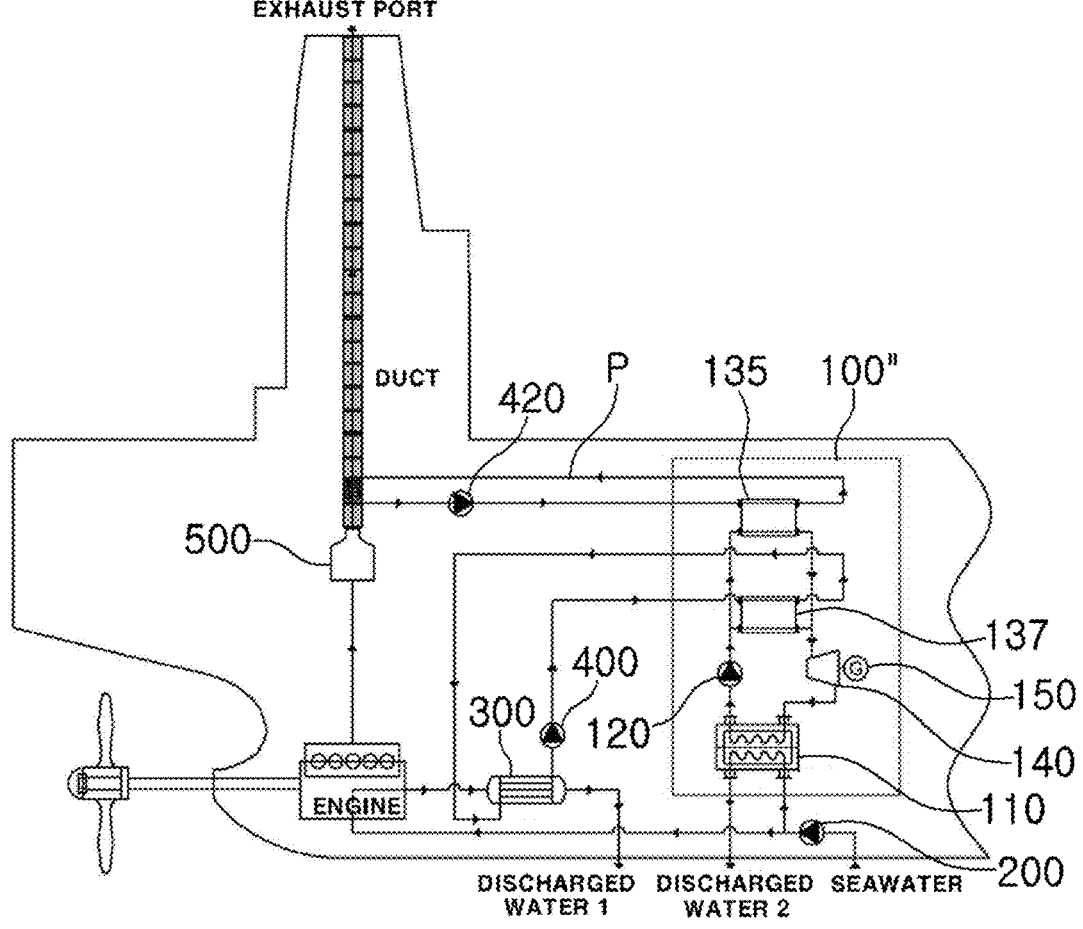
[FIG. 3]

SHIP WASTE HEAT POWER GENERATION SYSTEM UTILIZING WASTE HEAT FROM SHIPS

CROSS-REFERENCE TO RELATED APPLICATIONS

This application is a continuation of International Application No. PCT/KR2023/011570 filed on Aug. 7, 2023, which claims priority to Korean Patent Application No. 10-2022-0119571 filed on Sep. 21, 2022, the entire contents of which are herein incorporated by reference.

TECHNICAL FIELD

The present invention relates to a ship waste heat power generation system utilizing waste heat from ships. Specifically, the present invention relates to a ship waste heat power generation system utilizing waste heat from ships, wherein recovers exhaust gas waste heat and engine cooling water waste heat from ships using various fuels such as diesel, LNG, and dual-fuel. The recovered waste heat is used as a heat source, while seawater serves as the heat sink, generating electricity through the Organic Rankine Cycle (ORC). By combining exhaust gas waste heat and engine cooling water waste heat, which have different waste heat temperatures, in parallel or series to reduce the evaporation heat capacity, the ORC output is enhanced.

BACKGROUND ART

The International Maritime Organization (IMO) has set a strategy to reduce greenhouse gas emissions from ships, aiming to improve the overall energy efficiency of international shipping by 40% by 2030 and achieve a 50% reduction in greenhouse gas emissions by 2050, with the ultimate goal of net-zero emissions within this century. To comply with the IMO's greenhouse gas regulations, a long-term transition to carbon-free fuels and electric propulsion systems is inevitable. However, in the short- and mid-term, using low-carbon fuels such as LNG and applying technologies to enhance ship operational efficiency are necessary measures. From this perspective, recycling waste heat generated from ship internal combustion engines or cryogenic cargo holds can contribute to additional energy savings and improved operational efficiency. In particular, while electric propulsion systems utilizing fuel cells, batteries, and the like are unlikely to be commercially viable for large ships in the short term from both technical and economic perspectives, waste heat recovery technology for ships is expected to be a practical and effective regulatory response that can be applied to ships using conventional internal combustion engines.

In existing ships, exhaust gas is discharged at a high temperature of around 400° C., and steam is generated in the economizer, reducing the exhaust temperature to approximately 240° C. However, traditional steam generation methods have limited applications and utilization. If this waste heat is used as a heat source for ship waste heat power generation, the exhaust temperature can be further reduced to around 200° C., and the generated electricity can be used to power various onboard devices while making additional use of otherwise discarded waste heat. Meanwhile, engine cooling water is maintained at around 90° C. and is used as a heat source for evaporative desalination systems. However, evaporative desalination has a low production capacity relative to its large volume, and most of the heat is discharged into the seawater. If this discharged heat is further utilized for ship waste heat power generation, energy recovery efficiency can be improved.

Additionally, to reduce greenhouse gas emissions during ship operation, ship fuel is transitioning from conventional diesel to low-carbon fuels such as LNG and ammonia, with an increasing number of LNG-fueled ships due to their low sulfur content. LNG-fueled ships do not experience low-temperature corrosion, which typically occurs at temperatures below 150° C. Therefore, they can accommodate large-scale waste heat utilization systems, contributing to the reduction of greenhouse gas emissions during ship operation.

DOCUMENT OF RELATED ART

Patent Document (Patent Document 0001) Korean Patent Publication No. 2012-0110709 (Title of the Invention: Organic Rankine Cycle Power Generation System Utilizing Waste Heat)

DISCLOSURE

Technical Problem

Accordingly, the present invention has been devised in view of the above-described circumstances. An objective of the present invention is to provide a ship waste heat power generation system utilizing waste heat from ships that enhances the energy recovery rate of waste heat discarded from ships using various fuels.

Another objective of the present invention is to provide a ship waste heat power generation system utilizing waste heat from ships that improves the output of the Organic Rankine Cycle by increasing the evaporation heat capacity through the combination of exhaust gas waste heat and engine cooling water waste heat, which have different temperatures, in parallel or series configurations.

Technical Solution

To achieve the above objectives, a ship waste heat power generation system utilizing waste heat from ships according to an aspect of the present invention, comprises an Organic Rankine Cycle (100) which uses steam passed through an economizer (500) and a boiler (600) installed on the ship's exhaust port side, and heated first freshwater that has recovered heat via a heat exchanger (300) from heated seawater discharged after the ship's engine cooling as a heat source, as well as uses some of the seawater introduced by the suction pump (200) as a heat sink. The Organic Rankine Cycle includes: an evaporator (130) that uses the steam and the heated first freshwater as a heat source; a turbine generator (140, 150) that rotates to produce electricity by working fluid evaporated by the evaporator and discharged; a condenser (110) that liquefies the working fluid discharged from the turbine generator by using some of the seawater introduced through the suction pump as a heat sink; and a circulation pump (120) that compresses and provides the working fluid discharged from the condenser to the evaporator.

To achieve the above objectives, a ship waste heat power generation system utilizing waste heat from ships according to another aspect of the present invention, comprises an Organic Rankine Cycle (100') which uses heated second freshwater heated by recovering heat from heated freshwater discharged after cooling an engine of the ship through a second heat exchanger (320), as a primary heat source, uses steam that has passed through an economizer (500) and boiler (610) installed on the ship's exhaust port side as a secondary heat source, and uses some of third freshwater that has been heat-exchanged in a first heat exchanger (310) by seawater introduced through a suction pump (200) as a heat sink. The Organic Rankine Cycle includes: an evaporator 1 (131) using the second freshwater as a heat source; an evaporator 2 (133) using the steam as the heat source and connected in series with the evaporator 1; a turbine generator (140, 150) that is rotated by working fluid discharged after being evaporated by the evaporators 1 and 2 and generates electricity; a condenser (110) that uses some of the third freshwater as the heat sink to liquefy the working fluid discharged from the turbine generator; and a circulation pump (120) that compresses the working fluid discharged from the condenser and provides it to the evaporator 1.

In above aspect, the first heat exchanger (310) heat-exchanges the third freshwater using seawater introduced via the suction pump (200); the second heat exchanger (320) heat-exchanges the second freshwater using the heat-exchanged third freshwater and; a circulation pump (330) circulates the third freshwater between the first heat exchanger (310) and the second heat exchanger (320); a circulation pump (410) circulates the second freshwater between the second heat exchanger (320) and evaporator 1 (131).

To achieve the above objectives, a ship waste heat power generation system utilizing waste heat from ships according to yet another aspect of the present invention, comprises an organic Rankine cycle (100") which uses first freshwater heated by waste heat of a duct in a pipe (P) passing through an outer side of one end of the duct of the ship, and second fresh water heated by recovering heat from heated seawater discharged after cooling the engine of the ship through a heat exchanger (300) as a heat source, and uses some of the seawater introduced through a suction pump (200) as a heat sink. The Organic Rankine Cycle includes: an evaporator 3 (135) that uses the first freshwater as the heat source; an evaporator 4 (137) connected in parallel with the evaporator 3, using the second freshwater as the heat source; a turbine generator (140, 150) that is rotated by a working fluid discharged after being evaporated by the evaporators 3 and 4 to produce electricity; a condenser (110) that liquefies the working fluid discharged from the turbine generator by using some of the seawater introduced via the suction pump as a heat sink; and a circulation pump (120) that compresses the working fluid discharged from the condenser and provides it to the evaporators 3 and 4.

In above yet another aspect, the ship waste heat power generation system utilizing waste heat from ships, further comprising: a circulation pump (420) that circulates the first freshwater heated by the waste heat of the duct in the pipe (P) through the evaporator 3 (135); and a circulation pump (400) that circulates the second fresh water heated through the heat exchanger (300) through the evaporator 4 (137).

Advantageous Effects

According to the ship waste heat power generation system utilizing waste heat from ships according to the aspect of the present invention configured as described above, the system uses, as a heat source, freshwater heated through an economizer and boiler installed on the exhaust port side of the ship, as well as the heated freshwater, which recovers heat through the heat exchanger from heated seawater discharged after cooling the engine of the ship, and includes an organic Rankine cycle that uses some of the seawater introduced through a suction pump as a heat sink, thereby increasing the energy recovery rate of waste heat discarded from ships that use various ship fuels.

Furthermore, according to the ship waste heat power generation system utilizing waste heat from ships according to the aspect of the present invention configured as described above, the organic Rankine cycle output can be improved by increasing the evaporation heat by combining evaporators that use freshwater heated by exhaust gas waste heat and engine cooling water waste heat with different waste heat temperatures as a heat source.

DESCRIPTION OF DRAWINGS

FIG. 1 is a configuration diagram of a ship waste heat power generation system utilizing waste heat from ships according to the first embodiment of the present invention.

FIG. 2 is a configuration diagram of a ship waste heat power generation system utilizing waste heat from ships according to the second embodiment of the present invention.

FIG. 3 is a configuration diagram of a ship waste heat power generation system utilizing waste heat from ships according to the third embodiment of the present invention.

DETAILED DESCRIPTION

In describing the embodiments of the present invention, detailed explanations of prior art related to the invention may be omitted if it is determined that such explanations may unnecessarily obscure the essence of the invention. Furthermore, the terms used in the following description are terms defined based on the functions in the present invention, which may vary depending on the user, operator's intention, or convention. Therefore, the definition should be based on the content of the entire specification. The terms used in the detailed description are only for describing the embodiments of the present invention and should not be interpreted in a limiting manner. Unless explicitly stated otherwise, singular forms should be understood to include plural forms. In this specification, expressions such as "comprise" or "include" refer to characteristics, numbers, steps, actions, elements, or combinations thereof, and should not be construed as excluding the presence or possibility of one or more additional characteristics, numbers, steps, actions, elements, or combinations thereof.

In the systems shown in the drawings, elements in some cases may have the same reference number or different reference numbers, suggesting that the represented elements may be either different or similar. However, the elements can operate with several or all of the systems shown or described in the present specification with different implementations. The various elements shown in the drawings can be the same or different. The designation of "first element" or "second element" is arbitrary.

In this specification, when one component transmits, delivers, or provides data or signals to another component, it includes not only the direct transmission of data or signals between components but also the transmission through at least one other component.

Below, the embodiments of the present invention will be described in detail with reference to the drawings.

First Embodiment

FIG. 1 is a configuration diagram of a ship waste heat power generation system utilizing waste heat from ships according to the first embodiment of the present invention.

The ship waste heat power generation system utilizing waste heat from ships according to the first embodiment of the present invention, as shown in FIG. 1, includes the organic Rankine cycle (100) and surrounding components.

The organic Rankine cycle (100) functions to generate electricity using waste heat that is discarded through the engine and exhaust port without the use of fuel. The organic Rankine cycle (100) includes an evaporator (130), turbine generators (140, 150), a condenser (110), and a circulation pump (120).

The evaporator (130) functions to evaporate the working fluid by using, as heat sources, steam passing through an economizer (500) and boiler (600) installed on the exhaust port side of the ship, as well as the heated first freshwater, which recovers heat through a heat exchanger (300) from heated seawater discharged after cooling the ship's engine.

The turbine generator functions to rotate due to the working fluid evaporated and discharged from the evaporator (130), generating electricity. It includes a turbine (140) that rotates due to the discharged working fluid and a generator (150) that produces electricity as the turbine (140) rotates.

The condenser (110) functions to liquefy the working fluid discharged from the turbine generator (140, 150) by using some of the seawater introduced through the suction pump (200) as a heat sink.

The circulation pump (120) functions to compress the working fluid discharged from the condenser (110) and supply it to the evaporator (130).

The surrounding components include the suction pump (200), heat exchanger (300), circulation pump (400), economizer (500), and boiler (600).

The suction pump (200) functions to introduce seawater through the rotational force of a motor and supply it to the condenser (110) and engine cooling components.

The heat exchanger (300) functions to heat exchange the second freshwater supplied to the evaporator (130) using the heated seawater discharged after cooling the engine.

The circulation pump (400) functions to circulate the second freshwater between the heat exchanger (300) and the evaporator (130).

The economizer (500) is a device that preheats the feed water entering the boiler (600) using the exhaust heat from the exhaust port side. It is also referred to as a "de-aerator." The economizer (500) improves thermal efficiency of the boiler (600) and reduces thermal stress and corrosion of the boiler walls.

The boiler (600) functions to generate heated steam using the ship's fuel, and supply the steam to the evaporator (130).

According to the ship waste heat power generation system utilizing waste heat from ships according to the first embodiment of the present invention configured as described above, the system uses, as a heat source, steam passing through an economizer and boiler installed on the exhaust port side of the ship, as well as the heated freshwater, which recovers heat through the heat exchanger from heated seawater discharged after cooling the engine of the ship, and includes an organic Rankine cycle that uses some of the seawater introduced through a suction pump as a heat sink, thereby increasing the energy recovery rate of waste heat discarded from ships that use various ship fuels.

Second Embodiment

FIG. 2 is a configuration diagram of a ship waste heat power generation system utilizing waste heat from ships according to the second embodiment of the present invention.

The ship waste heat power generation system utilizing waste heat from ships according to the second embodiment of the present invention, as shown in FIG. 2, includes the organic Rankine cycle (100') and surrounding components.

The organic Rankine cycle (100') functions to generate electricity using waste heat discarded through the engine and exhaust port, without using fuel. The organic Rankine cycle (100') includes evaporator 1 (131), evaporator 2 (133), turbine generator (140, 150), condenser (110), and circulation pump (120).

Evaporator 1 (131) functions to recovers heat from the heated second freshwater discharged after cooling the ship's engine through the second heat exchanger (320), using the heated second freshwater as a heat source to further evaporate the working fluid.

Evaporator 2 (133) is connected in series with evaporator 1 (131) and functions to evaporate the working fluid evaporated in the first stage by evaporator 1 (131) through secondary evaporation. Evaporator 2 (133) uses steam, which has passed through the economizer (500) and boiler (610) installed on the exhaust port side of the ship, as a heat source for the primary evaporation of the working fluid.

The turbine generator functions to rotate due to the working fluid evaporated and discharged from evaporators 1 and 2 (131, 133), producing electricity. It includes a turbine (140) that rotates due to the discharged working fluid and a generator (150) that generates electricity as the turbine (140) rotates.

The condenser (110) functions by using some of the third freshwater, which has undergone heat exchange in the first heat exchanger (310) through seawater introduced by the suction pump (200), as a heat sink to liquefy the working fluid that is discharged from the turbine generator (140, 150).

The circulation pump (120) functions to compress the working fluid discharged from the condenser (110) and supply it to evaporator 1 (131).

The surrounding components include the suction pump (200), first heat exchanger (310), second heat exchanger (320), circulation pump (330), circulation pump (410), economizer (500), and boiler (610).

The suction pump (200) functions to introduce seawater through the rotational force of a motor and supplies it to the first heat exchanger (310).

The first heat exchanger (310) functions to heat exchange the third freshwater supplied to the condenser (110) using the seawater introduced through the suction pump (200).

The second heat exchanger (320) functions to heat exchange the second freshwater supplied to evaporator 1 (131) using the heat-exchanged third freshwater.

The circulation pump (330) functions to circulate the third freshwater between the first heat exchanger (310) and the second heat exchanger (320).

The circulation pump (410) functions to circulate the second freshwater between the second heat exchanger (320) and evaporator 1 (131).

The economizer (500) is a device that preheats the feedwater entering the boiler (610) by using the heat from the exhaust port side. It is also referred to as a "de-aerator." The economizer (500) improves thermal efficiency of the boiler (610) and reduces thermal stress and corrosion of the boiler walls.

The boiler (610) functions to generate steam using the ship's fuel, and supply the steam to evaporator 1 (131).

According to the ship waste heat power generation system utilizing waste heat from ships according to the second embodiment of the present invention configured as described above, the organic Rankine cycle output can be improved by increasing the evaporation heat by combining evaporators 1 and 2 (131, 133) that use freshwater heated by exhaust gas waste heat and engine cooling water waste heat with different waste heat temperatures as a heat source.

Third Embodiment

FIG. 3 is a configuration diagram of a ship waste heat power generation system utilizing waste heat from ships according to the third embodiment of the present invention.

The ship waste heat power generation system utilizing waste heat from ships according to the third embodiment of the present invention includes an Organic Rankine Cycle (100") and surrounding components, as shown in FIG. 2.

The Organic Rankine Cycle (100") functions to generate power from the waste heat released through the engine and exhaust port without using fuel. The Organic Rankine Cycle (100") includes an evaporator 3 (135), an evaporator 4 (137), a turbine generator (140, 150), a condenser (110), and a circulation pump (120).

The evaporator 3 (135) functions to recover heat from heated seawater discharged after engine cooling through a heat exchanger (300), and evaporate the working fluid using the heated second freshwater as a heat source.

The evaporator 4 (137) is connected in parallel with evaporator 3 (135) and uses the heated first freshwater, which has been heated by the waste heat of the duct in the pipeline (P) passing through the outer side of the duct, as a heat source to evaporate the working fluid. The parallel operation of the evaporators increases the reliability of the heat source and allows for selecting the power generation based on steam and cooling water heat amounts.

The turbine generator is evaporated by evaporators 3 and 4 (135, 137) and then rotated by the discharged working fluid to generate power. It includes a turbine (140) that rotates due to the flowing working fluid and a generator (150) that produces power during the turbine's rotation.

The condenser (110) functions to liquefy the working fluid flowing out of the turbine generator (140, 150) using some of the seawater introduced by the suction pump (200) as heat sink.

The circulation pump (120) functions to compress the working fluid flowing out of the condenser (110) and provide it to evaporators 3 and 4 (135, 137).

The surrounding components include the suction pump (200), heat exchanger (300), circulation pump (400), and circulation pump (420).

The suction pump (200) functions to introduce seawater by the motor's rotational force and supply it to the condenser (110) and engine cooling.

The heat exchanger (300) functions to heat exchange the second freshwater supplied to evaporator 4 (137) using the heated seawater discharged after engine cooling.

The circulation pump (400) functions to circulate the second freshwater between the heat exchanger (300) and evaporator 4 (137).

The circulation pump (420) functions to circulate the first freshwater, which has been heated by the waste heat of the duct in the pipeline (P), through evaporator 3 (135).

According to the ship waste heat power generation system utilizing waste heat from ships according to the third embodiment of the present invention, when the organic Rankine cycle (100") is configured, evaporators 3, 4 (135, 137), which use freshwater heated by exhaust gas waste heat and engine cooling water waste heat with different waste heat temperatures, as heat source, can be combined in parallel to reduce evaporation heat, thereby improving organic Rankine cycle efficiency.

The drawings and specification describe the optimal embodiments, and while specific terms have been used, these are merely for explaining the embodiments of the present invention and are not intended to limit the meaning or the scope of the claims. Therefore, a person skilled in the art would understand that various modifications and equivalent embodiments are possible. The true technical scope of the present invention should therefore be defined by the technical spirit of the claims appended hereto.

The invention claimed is:

1. A ship waste heat power generation system in a ship comprising:
   a first heat exchanger (310);
   a second heat exchanger (320);
   an economizer (500);
   a suction pump (200);
   a boiler (610);
   a first circulation pump (330);
   a second circulation pump (410);
   a seawater intake wherein the seawater intake providing a seawater;
   a first freshwater loop passing through an engine;
   a second freshwater loop; and
   a working fluid loop including a working fluid, wherein:
   the first heat exchanger (310) transfer heat between the first freshwater loop comprising a first freshwater and the seawater introduced via the suction pump (200);
   the second heat exchanger (320) transfers heat between the first freshwater loop and the second freshwater loop;
   the first circulation pump (330) circulates the first freshwater between the first heat exchanger (310) and the second heat exchanger (320); and
   the second circulation pump (410) circulates a second freshwater between the second heat exchanger (320) and a first evaporator (131),
   wherein an Organic Rankine Cycle (100') comprises:
   the first evaporator (131) configured to heat the working fluid with the second freshwater; and
   a second evaporator (133) configured to heat the working fluid; and
   wherein the second evaporator (133) is connected in series with the first evaporator (131);
   a turbine (140) rotated by the working fluid heated by the second evaporator (133) and a generator (150) generating electricity by the rotation of the connected turbine (140); and
   a condenser (110) configured to liquefy the working fluid discharged from the turbine (150) coupled to the generator (140).

2. A ship waste heat power generation system in a ship, comprising:
   a heat exchanger (300);
   an economizer (500);
   a suction pump (200);
   a circulation pump (120);
   a seawater intake wherein the seawater intake providing a seawater;
   a freshwater loop including a freshwater; and
   a working fluid loop including a working fluid,
   wherein the heat exchanger (300) transfers heat between the seawater and the freshwater, and
   wherein the Organic Rankine Cycle includes:
   a first evaporator (135) configured to heat the working fluid with the freshwater;

a second evaporator (137) connected in parallel with the first evaporator (135) and configured to heat the working fluid;

a turbine generator (140, 150) that is rotated by the working fluid discharged after being heated by the first evaporator (135) and the second evaporator (137); and a condenser (110) that liquefies the working fluid discharged from a turbine (150).

* * * * *